(12) United States Patent
Tache

(10) Patent No.: US 7,488,036 B2
(45) Date of Patent: Feb. 10, 2009

(54) SEAT COVER FOR AUTOMOTIVE VEHICLE SEAT

(75) Inventor: Oscar Tache, Farmington Hills, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 111 days.

(21) Appl. No.: 11/519,299

(22) Filed: Sep. 12, 2006

(65) Prior Publication Data

US 2008/0061610 A1  Mar. 13, 2008

(51) Int. Cl.
*A47C 31/00* (2006.01)

(52) U.S. Cl. .............. 297/228.13; 297/228.1; 297/219.1

(58) Field of Classification Search ........... 297/188.01, 297/219.1, 228.1, 228.13, 218.2
See application file for complete search history.

(56) References Cited

U.S. PATENT DOCUMENTS

| | | | | |
|---|---|---|---|---|
| 2,792,055 | A * | 5/1957 | O'Neil | 297/188.01 |
| 4,019,776 | A * | 4/1977 | Takamatsu | 297/219.1 |
| 4,557,522 | A * | 12/1985 | Isikawa | 297/452.58 |
| 5,005,901 | A | 4/1991 | Hinde | |
| 5,007,676 | A * | 4/1991 | Lien | 297/228.13 |
| 5,067,772 | A | 11/1991 | Koa | |
| 5,150,945 | A | 9/1992 | Aupperlee | |
| 5,228,745 | A | 7/1993 | Hazel | |
| 5,294,166 | A | 3/1994 | Shapland | |
| 5,448,938 | A | 9/1995 | Fernandez | |
| 5,475,886 | A * | 12/1995 | Mintz | 5/653 |
| 5,584,422 | A | 12/1996 | Bond-Madsen | |
| 5,641,199 | A | 6/1997 | Bond-Madsen | |
| 5,655,813 | A | 8/1997 | Kirkpatrick | |
| 5,707,107 | A | 1/1998 | Melone | |
| 5,820,214 | A * | 10/1998 | Bessette et al. | 297/228.13 |
| 5,957,528 | A | 9/1999 | Campbell | |
| 5,967,614 | A | 10/1999 | Schmidt | |
| 6,050,639 | A | 4/2000 | Horn | |
| 6,089,659 | A | 7/2000 | Toyota | |
| 6,338,527 | B1 | 1/2002 | Toyota | |
| 6,382,720 | B1 * | 5/2002 | Franklin et al. | 297/228.13 |
| 6,616,225 | B2 | 9/2003 | Graff | |
| 6,648,410 | B2 | 11/2003 | Sparks | |
| 6,652,026 | B2 | 11/2003 | Toyota | |
| 6,655,736 | B1 | 12/2003 | Arenas | |
| 6,659,551 | B1 | 12/2003 | Arenas | |
| 6,676,209 | B1 | 1/2004 | Szabo | |
| 6,817,664 | B1 * | 11/2004 | Tang et al. | 297/229 |
| 6,971,716 | B2 | 12/2005 | DePaulis | |
| 7,000,984 | B1 | 2/2006 | Ward | |
| 7,172,246 | B1 * | 2/2007 | Itakura | 297/219.1 |
| 2001/0035672 | A1 | 11/2001 | Graff | |
| 2002/0093232 | A1 | 7/2002 | Toyota | |
| 2003/0155796 | A1 | 8/2003 | DePaulis | |
| 2004/0130192 | A1 | 7/2004 | Rojas | |
| 2004/0183347 | A1 * | 9/2004 | Szabo et al. | 297/229 |
| 2004/0212230 | A1 | 10/2004 | Hanks | |

* cited by examiner

*Primary Examiner*—Sarah B McPartlin
(74) *Attorney, Agent, or Firm*—Young Basile

(57) ABSTRACT

A cover for a seat portion of an automotive vehicular seat, the cover including a panel releasably engageable with an attachment mechanism mounted on the upholstery layer of the vehicle seat. The cover layer overlies the seat surface of the vehicle seat when in the attached position.

17 Claims, 2 Drawing Sheets

SEAT COVER FOR AUTOMOTIVE VEHICLE SEAT

BACKGROUND

The present invention pertains to seating for automotive vehicles. More particularly, the present invention pertains to detachable elements associated with automotive vehicular seat covers.

Passenger seats in automotive vehicles can potentially be exposed to a great deal of day-to-day wear. There has been great interest in providing various devices that can be employed with passenger vehicle seats to preserve and protect the vehicle seats. These include various types of covers and the like. Many of these are designed to envelop the vehicle seat or a portion thereof. Depending upon the particular design, these covers tend to shift, bunch and move, and can obscure the line or contour of the underlying vehicle seat.

Additionally, passenger vehicle seats provide limited opportunity for additional cushioning and adaptation to the needs of the given occupant. Typically, bolsters, cushions, pads, and the like, when employed, are completely independent of the passenger vehicle seat. As such, they can move and shift relative to the seat.

Thus, it would be desirable to provide a vehicle seat in which at least a portion of the seat is configured to have a suitable cover removably detachable thereto. It would also be desirable to provide a cover that is dimensionally conforming to a vehicle seat and removably attachable thereto.

SUMMARY

Disclosed herein is a seat portion for a vehicle seat that includes a cushioning member having a seating surface, a leading or front lateral surface and a pair of opposed lateral surfaces extending therefrom. The seat portion also includes an upholstery layer covering the seating surface and the lateral surfaces. The upholstery layer has an outwardly positioned face and at least one attachment member mechanism connected to the outwardly oriented face at a location overlying the lateral surfaces of the cushioning member. The seat portion also includes a cover covering at least a portion of the upholstery layer at a location proximate to the seating surface of the cushioning member. The cover is releasably connected to the attachment mechanism located on the upholstery layer.

DETAILED DESCRIPTION

Disclosed herein is a seat portion for an automotive vehicle seat as well as a vehicle seat that includes seat portion and an automotive vehicle that includes at lease one seat portion for an automotive vehicle seat. The seat portion is composed of a cushioning member defining a seating surface a front facing lateral surface and opposed side lateral surfaces extending angularly from the seating surface. The seat portion has an upholstery layer covering the seating surface and the associated lateral surfaces. The upholstery layer has an inwardly oriented face directed toward the cushioning member and an outwardly oriented face opposed thereto. At least one attachment mechanism is connected to the outwardly oriented face of the upholstery layer. The seat portion disclosed herein also includes a cover that overlies the upholstery layer at a location proximate to the seating surface of the cushioning member. The cover is releasably connected to the attachment mechanism defined connected to the upholstery layer.

It is contemplated that the vehicle seat and associated seat portion can be used with or without the cover. When the cover is not in use, it can be stored in a suitable storage container included with the seat portion.

An embodiment of this device is depicted in the various drawing figures. Vehicle seat 10 can have any suitable configuration including, but not limited to, a bench seat, an individual passenger seat, and the like. As depicted in FIGS. 1-4, the vehicle seat 10 is configured for an individual passenger. The vehicle seat 10 has at least one seat portion 12. The seat portion 12 can be either a lower seat member or an upper seat member such as a seat back. In the embodiment depicted FIGS. 1 and 2, seat portion 12 is a lower seat portion. The seat portion 12 as depicted has an upwardly extending seat back portion 14 moveably connected thereto. Where desired or required, the seat back 14 can be configured in the manner described herein. Such configuration can be instead of or in addition to the lower seat portion depicted.

Figure 4A:
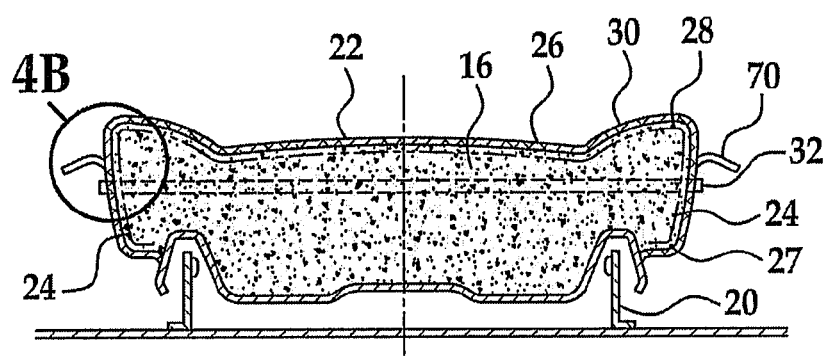
FIG. 4A is a cross-sectional view taken along the 4-4 line of FIG. 3.

As best seen in FIG. 4A, seat portion 12 includes a cushioning member 16. Cushioning member 16 can be configured to provide suitable occupant support and can be affixed or attached to a suitable frame or support 18 in any suitable manner as desired or required. In the embodiment depicted, frame 18 can be attached to an appropriate structural member 20 connected to the surrounding passenger compartment. Alternately, the frame 18 can be configured to encompass support and mounting elements.

The cushioning member 16 defines a seating surface 22, a pair of opposed lateral side surfaces 24 and a leading or front surface face 25. These lateral surfaces are connected to the seating surface 22. The pair of opposed lateral side surfaces 24 and the leading front surface 25 extend angularly from the seating surface 22 to define contours in the cushioning member 16. The leading front lateral surface 25 and opposed lateral side surfaces 24 terminate in a lower edge 27 that extends continuously around the cushioning member 16 at a location opposed to the seating surface 22.

Cushioning member 16 can be composed of any suitable material that can distribute and/or absorb passenger weight and the like. Nonlimiting material examples include molded foam, contoured plastic, and the like. Cushioning member 16 can be configured with structural contours as desired or required. The structural contours can include, but are not limited to, side bolsters, seat depressions, support contours, and the like. Structural contours can be molded or formed in the cushioning member 16 by any suitable method.

An upholstery layer 26 covers the seating surface 22, the lateral side surfaces 24, and the leading or front face 25 and the lower edge 27 of cushioning member 16. As depicted, the upholstery layer 26 is positioned in overlying relationship with the cushioning member 16 and is attached to it or to any suitable structural member such as frame 18 in a generally fixed manner. As used herein, the term "fixed" is defined attachment in generally manner that renders the upholstery layer generally non-removable by the occupant-user.

The upholstery layer 26 is generally has a taut yet deformable relationship relative to cushioning member 16. Other strategies are considered within the purview of this disclosure. The upholstery layer 26 can be attached in overlying relationship with the cushioning member 16 of the seat portion 12 in any suitable permanent manner. Non-limiting examples for attachment include connection of the upholstery layer 26 to the frame 18 by any mechanism such as grommets or the like. The term "permanent" is taken to mean that the upholstery layer 26 is not configured for ready removal from the cushioning member 16.

The upholstery layer 26 can be constructed of any suitable woven or non-woven sheet stock including, but not limited to, fabric, leather, synthetic sheet stock materials and the like. The upholstery layer 26 has an inwardly oriented face 28 directed toward the cushioning member 16 as well as an opposed outwardly oriented face 30. The upholstery layer 26 can directly overlie the cushioning member 16 or can have intermediate layers or materials interposed between the upholstery layer 26 and the cushioning member 16.

The upholstery layer 26 can be composed of single or multiple layers of fabric, leather, polymer sheet or the like that can be connected to each other in any suitable fashion. The upholstery layer 26 can be constructed as a single continuous panel or can be constructed in sub-panels joined together at suitable junctions such as seams. If desired, such seams can be positioned at suitable locations such as structural positions as that corresponding to the junction between the seating surface 22 and lateral side surfaces 24; seating surface and leading or front surface 25; lateral side surface 24 and leading or front surface 25 and the like. Seams can also be located to define or encompass contours defined within a region such as on the seating surface 22 or the like. Nonlimiting examples of such structural elements include bolsters, depressed contours, and the like. Suitable seams or junctions can also be positioned for aesthetic or decorative purposes as to join two different upholstery materials, add piping and the like.

The upholstery layer 26 can also be configured define contours and structural elements present in addition to or instead of those found in the cushioning member 16. Where desired or required, upholstery layer 26 may include suitable structural support members (not shown) integrated therein. Structural contours can be built or integrated into the upholstery layer 26 by any suitable means including formation of pockets, reinforcements and the like.

The upholstery layer 26 has a suitable attachment mechanism 32 configured to releasably connect to cover 40. The attachment mechanism 32 is attached to the upholstery layer 26 on its outwardly oriented face 30 at any suitable location. As depicted particularly in FIGS. 1, 3A and 4A, attachment mechanism 32 is connected to the outwardly oriented face 30 of upholstery layer 26 at a position suitable for releasable engagement with a suitable cover 40. In the embodiment depicted, the attachment mechanism 32 is located at a position where upholstery layer 26 overlies lateral surfaces 24 and leading or front surface 25 of the cushioning member 16. The attachment mechanism 32 can be positioned at any location on the respective faces. In the embodiment depicted, the attachment mechanism 32 is located midway up the respective surfaces.

The attachment mechanism 32 can be mounted or attached to the upholstery layer in a manner that extends around least a portion of the periphery of cushioning member 16 in either a continuous or discontinuous manner. In various embodiments, the attachment mechanism 32 can extend around the three sides of the seat portion 10 such as around the opposed lateral sides 24 and the leading or front face 25. It is considered within the purview of this disclosure that the attachment mechanism be located at other suitable locations on the upholstery layer and the cover 40 be configured accordingly.

In the embodiment depicted in the drawing figures, the attachment mechanism 32 is connected to the upholstery layer 26 at a location that permits it to extend continuously around at least the front leading surface 25 and two opposed lateral side surfaces 24 of the seat portion 12. It is considered within the purview of this invention that individual attachment mechanisms can be placed periodically on the outwardly oriented face 30 of the upholstery layer 26 in a manner that enables a suitable cover 40 to be attached in secure engagement to the upholstery layer 26 and associated seat portion 12.

The attachment mechanism 32 can be any suitable device capable of releasably engaging a cover member 40. Nonlimiting examples of suitable attachment mechanisms include zippers, hooks and eyes, hook and loop fastener elements, grommets, snap fasteners, buttons, and the like. In an embodiment as depicted in the drawing figures, a portion 34 of a two-part detachable zipper mechanism is employed as the attachment mechanism 32. The two-part detachable zipper mechanism includes a first zipper element portion 34 attached to the outwardly oriented face 30 of upholstery layer 26 by any suitable means. Nonlimiting examples of zipper element attachment means include mechanical seams 38. Other methods for attaching first zipper element portion 34 to the upholstery layer 26 include, but are not limited to adhesive bonding, fusion welding, and the like.

While the attachment mechanism 32 is discussed in terms of a two-part zipper mechanism, other attachment devices are considered within the purview of this disclosure. The manner of connecting the attachment mechanism 32 to the upholstery layer 26 can vary depending upon factors including, but not limited to, the specific type of attachment mechanism employed, the type or composition of the upholstery layer 26 and/or the cover 40, the specific configuration of the vehicle seat 10 and/or the cover 40, the specific construction pattern of the upholstery layer 26 and/or the cover 40 and the like.

The attachment mechanism 32 can be affixed to the upholstery layer at any location that will permit the cover 40 to be positioned in overlying relationship relative to seating surface 22 or at least a portion thereof. In the embodiment depicted in the drawing figures, the attachment mechanism 32 is located on the upholstery layer 26 in overlying relationship to the opposed lateral side surfaces 24 and the leading front edge 25 at a position approximately medial to the respective surfaces 24, 25 in an orientation essentially parallel to the lower edge 27 of cushioning member 16.

It is within the purview of this disclosure that the attachment mechanism 32 can be positioned at any location on these respective faces 24, 25 that permits releasable engagement of the cover 40. Where desired or required, attachment mechanism 32 could be affixed to the upholstery layer 26 at a suitable structural seam defined in the upholstery layer 26 such as at a junction between one panel of the upholstery layer overlying the seating surface 22 and a panel or panels overlying lateral surfaces 24 and front lateral surface 25. Alternately, the attachment mechanism 32 may be positioned in an intermediate seam defined in panels of the upholstery layer 26 overlying the opposed lateral side surfaces 24 and front lateral surface 25

Figure 3A:
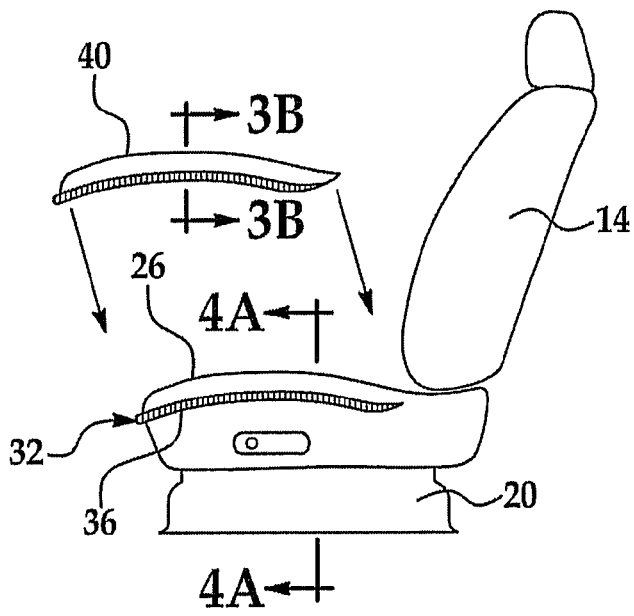
FIG. 3A is a side view of an embodiment as disclosed herein.
Figure 3B:
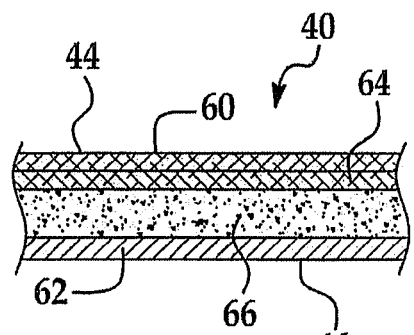
FIG. 3B is a partial cross sectional view taken through the 3A-3A line of an embodiment of a cover member as set forth in FIG. 3A.

The cover 40 can be configured to substantially cover the upholstery layer 26 at a location proximate to the seating surface 22 defined by cushioning member 16 and con be dimensioned to conform to the seating surface 22. The cover 40 is configured to be releasably connected to the upholstery layer 26 at attachment mechanism 32. Cover 40 can have suitable contours to conform to the corresponding portion of the upholstery layer 26 and/or underlying seating surface 22 and to be releasably attached to attachment mechanism 32. In the embodiment depicted in the drawing figures, cover 40 includes a seating panel 42 configured to overly at least a portion of the seating surface 22. The cover 40 also has an outwardly facing surface 44 and an opposed inwardly oriented surface 46 (as depicted in FIG. 3B).

The cover 40 has an outer edge 48 configured to permit mating engagement with attachment mechanism 32. In an embodiment as depicted in the drawing figures, the cover 40 includes at least one lateral side face 50 interposed between the seating panel 42 and the outer edge 48. The lateral side face 50 is configured to overlie and conform with a portion of the upholstery layer 26 proximate to at least one of the opposed lateral side surfaces 24 and front lateral surface 25 defined by cushioning member 16 and to permit mating engagement with the attachment mechanism 32 located on upholstery layer 26. The cover 40 also has an inwardly oriented edge 53. In the embodiment as depicted, the lateral side face 50 extends around the edge of the seating surface 42 one side that correspond to the opposed lateral side surfaces 24 and the front lateral surface 25 of the seat portion 12. The lateral face 50 tapers from a maximum width associated with the front lateral surface 25 to a minimum proximate to the inwardly oriented edge 53. In an embodiment as depicted, the inwardly oriented edge 53 is configured to lie flush with the upholstery layer 26 located over the rearward region of the lower portion 12. As depicted in the drawing figures, the inwardly oriented edge is positioned proximate to the seat back 14. It is also contemplated that the inwardly oriented edge 53 could be interposed between the upper portion 12 and the seat back portion 14.

Cover 40 includes suitable attachment member(s) 52 configured to releasably engage attachment mechanism 32 located on upholstery layer 26. These include, but are not limited to, suitable snaps, hooks, or other fastening members detachably connectable with the respective attachment mechanism 32 on upholstery layer 26. The attachment member(s) 52 can be located on the cover at a position capable of engaging the attachment mechanism 32 and overlying the upholstery layer 26. In an embodiment as depicted, the attachment mechanism is positioned proximate to the outer edge 48 of cover 40. It is also considered within the purview of this disclosure that the attachment member(s) 52 be located at a suitable position on the inwardly oriented face 46 of the cover 40 such that the cover 40 overlies the attachment member(s) 52 when the attachment member(s) 52 are engaged with attachment mechanism 32.

In an embodiment as depicted in the drawing figures, the attachment member 52 is a zipper element 54 of a two-part zipper mechanism positioned on the outer edge 48 of cover 40. The zipper element 54 of the two-part zipper mechanism attached to cover 40 is engageable with a mating zipper element 34 of attachment mechanism 32. When the attachment member 52 is engaged with the attachment mechanism 32 interaction between the two zipper elements 34, 54 will provide a secure engagement between cover 40 and upholstery layer 26 so that there is little or no slippage or movement of the cover 40 relative to the seat 10.

In an embodiment as depicted in the various drawing figures, the attachment mechanism 32 includes zipper element 34. Zipper element 34 is configured to engage a mating zipper element 54 present on cover 40. Zipper element 34 has a leading edge 36 configured to engage a leading edge 56 of mating zipper element 54 and to permit initiation of zipping action. In the embodiment as depicted, the leading edge 36 is positioned on one of the lateral side surfaces 24 at a location generally rearward on the seat portion 12 of the vehicle seat 10.

Mating zipper element 54 has a leading edge 56 positioned a side of cover 40 that corresponds to the portion of upholstery layer 26 on which leading edge 36 of zipper element 34 is positioned. The leading edge 56 of zipper element 54 can be inserted into a leading edge 36 of zipper element 34. Zipping action can proceed through the length of the mating zipper elements 34 and 54 to fasten the cover 40 to the upholstery layer 26 attached to seat portion 12. The zipping action draws and orients the cover into mating overlying relationship with the seating surface 22. In an embodiment as depicted, zipping action begins on along one of the opposed lateral side surfaces 24 to engage zipper element 54 on a corresponding edge 48 of the cover 40 to the mating portion, zipper element 34. Zipping action proceeds through the front lateral surface 25 securing the corresponding edge 48 of cover 40 and orienting the cover relative to the vehicle seat portion 12. Once oriented, zipping action continues along the opposed lateral surface 24 and stops at a suitable terminal location (not shown) securing the cover 40 relative to that seating portion 12.

It is also considered to be within the purview of this disclosure that the respective zipper elements extend around the entire perimeter of the cover 40 and corresponding upholstery layer 26. Alternately, the cover 40 can be configured with independent zippers located on opposed sides of the cover 40 as on the sides corresponding to the side surfaces 24. Other types of fastening elements are also contemplated.

As depicted, the zipper members 36, 54 are present on three sides of the cover 40 and the corresponding lateral sides of the upholstery layer 26; typically those side corresponding to the opposed lateral side surface 24 and the front lateral surface 25. It is also contemplated that individual attachment members can be provided at selected locations to engage the periphery of the cover 40. Alternately, it is contemplated that the attachment mechanisms 32 can be located discontinuously around the perimeter of the seat portion in any suitable configuration.

It is contemplated that the cover 40 can be configured in any suitable size and/or shape and can be composed of suitable materials of construction. The cover 40 is dimensionally proportioned to conform to the seating surface and proximate regions when the cover 40 is in position on the seat portion 12.

The cover 40 is composed of at least one layer or sheet of a suitable material. This layer can a suitable woven or nonwoven material that is the same or different from the material of construction of the upholstery layer 26. Where desired or required, the cover can include a plurality of layers with at least one layer being a dress layer. Other optional layers may include reinforcement layers, lining layers and the like. The dress layer may be composed of a material that is the same as or complement the upholstery layer 26. Where the cover 40 includes a dress layer, the cover 40 can be removably fastened to lower portion 12 of seat 10 in such as way that removal facilitates cleaning, repair and/or replacement of the cover 40 as desired or required.

In various embodiments, the cover 40 may be liquid resistant. By "liquid resistant" as the term is used herein, the cover 40 is configured to prevent or deter permeation of undesirable liquids or dampness into the underlying upholstery layer 26 and/or through to the cushioning materials in the cushioning member 16. Undesirable liquids may be derived from a variety of sources including, but not limited to, liquid beverages, damp clothing, and the like. Other non-limiting examples of liquids include oils such as those derived from the skin or topically applied thereto as well as other oil-based products derived from food, emollients or other sources. Liquid resistance may be accomplished by pre or post-treatment of the dress layer the interaction of the various layers in the cover 40. It is also contemplated that liquid resistance may be accomplished by use of one or more layers in addition to the dress layer that are specifically composed of liquid resistant materials. The additional liquid resistant layer can be present instead of, or in addition to other layers such as the dress layer. Non-limiting examples of liquid resistant materials suitable for the liquid-resistant layer include various types of woven or non-woven materials that are inherently liquid resistant or can be rendered so by suitable treatments. Suitable materials include, but are not limited to, polymeric sheet stock and the like.

Where desired or required, at least one layer or cover 40 layer can be configured for occupant comfort. This layer can function as the dress layer or can be present in additional to the dress layer. The comfort layer may be configured to facilitate air permeation or ventilation through at least a portion of the cover 40; particularly the portion of the cover proximate to the occupant. It is also contemplated that the comfort layer can be configured with loft, pile or other materials that enhance the perceived "feel" of the cover 40 if desired or required. Where such a comfort layer is present, it is contemplated that the comfort layer may be positioned proximate to the dress layer when the cover 40 is in position on the lower portion of seat 10. The comfort layer can function as the dress or beauty layer if desired or required.

The cover 40 may also include additional layers configured to enhance occupant comfort. Thus, as desired or required, an outer dress or beauty layer may act in concert with at least one comfort layer to enhance beauty and comfort of the cover 40. In various embodiments, the dress layer can overlay a suitable comfort layer or layers. Non-limiting examples of suitable materials for the dress layer include various upholstery materials, as well as various other woven and non-woven, synthetic or natural fabrics. Non-limiting examples of various materials suitable for the comfort layer(s) include various polymeric foams, synthetic or natural batting materials and the like. Comfort materials can be selected for various criteria including, but not limited to, ability to cushion and/or transfer the weight of the occupant, their ability to transfer occupant body heat, their ability to resist or mitigate temperature extremes in the vehicle and the like. Where desired or required, the comfort layer(s) can be composed of multiple materials.

Where desired or required, the cover 40 can be configured to disperse concentrated or direct weight or pressure applied to it and the associated seat portion 12. In such embodiments, the cover 40 can include at least one layer configured to transfer and distribute at least a portion of the concentrated or direct pressure applied to it. Suitable materials include, but are not limited to, various heavy gauge sheets made of materials such as polymers. This layer can be present alone or in addition to at least one of the dress layer, comfort layer and the like. When a cover so configures is attached to that seat, items that could potentially damage the upholstery layer 26 can be positioned on top of the cover 40. Any pressure or concentrated weight can be dispersed of some or all of the surface area of the cover 40; thereby minimizing any damage caused by undo localized pressure caused by the item. A non-limiting example of such an item is a child safety seat. Such items may have feet or skids designed to rest on the lower portion 12 when the child safety seat is anchored to the vehicle seat 10.

The combined weight of the safety seat and the child-occupant can cause pressure and rubbing on the upholstery layer 26 that could damage the upholstery layer 26 over time. The use of cover 40 can reduce or minimize the associated wear on the upholstery layer 26 caused by continued or repeated pressure or contact.

The cover 40 may also be employed to reduce or minimize other potential for wear or damage. Thus the cover may include a layer or layers composed of a material that minimizes damage to the underlying upholstery layer due to factors including, but not limited to random abrasion, ultraviolet radiation or the like. The cover 40 can include at least one layer that provides or enhances abrasion resistance of the cover 40 relative to the upholstery layer 26. The abrasion resistant layer may be present as an independent layer. Alternately, abrasion resistance characteristics may be present in one or more of the existing layers. Where wear resistance is contemplated, at least one of the layers can be composed of a tough durable material that increases resistance to tears, abrasion and the like. As used herein UV resistance can be at least one of two characteristics: the ability to block or minimize transmission of damaging ultraviolet radiation through to the upholstery layer 26 and the ability to resist damage to that layer or layers of the cover 40. Where ultraviolet resistance is desired, at least one layer of cover 40 can be composed of a material or materials that can be inherently UV resistant or can be rendered so by use of additives treatment materials or the like. Where desired or required, the dress layer can be inherently UV resistant.

Where frictional resistance is desired, it is contemplated that an outermost upwardly oriented layer of the cover 40 can be composed of material(s) that increases frictional resistance between the cover surface and items placed on the cover 40. These materials can include, but are not limited to, polymeric materials that either have or are configured with geometric elements that provide frictional qualities. The material may also include sheet stock such woven and non-woven fiber materials that possess frictional qualities such as materials possessing a nap or the like.

When at least one layer of the cover 40 is configured to increase frictional resistance between the surface of the cover 40 and objects positioned on the cover 40, the frictional layer may have an upper contact surface configured to frictionally contact a device or devices placed on it. The upper contact surface can include a plurality of indentations and protrusions. The protrusions can have an upper surface area that can form the uppermost contact surface that will permit items to adhere to it in a mechanical fashion, as opposed to a chemical or adhesive manner. The protrusions and indentations 32 can be rounded or curvilinear to form a more gradual transition between the given protrusions and indentations, and to create a contour on the upper surface that is wavy or with a more natural appearance such as a leather-like texture. The contour creates an uppermost surface on the tops of the protrusions that contacts the item placed on it. The layer can be made of any suitable material that can provide a frictional and/or "tacky" surface. Non-limiting examples of such materials include expanded vinyl compositions as well as various polyurethanes.

The cover 40 may be composed of multiple layers of the same or different composition as desired or required. The various layers can be composed of woven or non-woven sheet stock chosen for desired performance or material characteristics. In one non-limiting example of a configuration of an embodiment of a layered cover 40 as depicted in FIG. 4A includes a pressure dispersing layer 62 positioned as a seat-facing surface of the cover 40 when it is positioned relative to the vehicle seat 10. In certain embodiments, the pressure dispersing layer 62 can also exhibit liquid-resistance characteristics.

In the embodiment of the cover 40 as depicted in FIG. 3B, the cover 40 can also include an outer or dress layer 60 composed of materials chose to complement or alter the look or style of the vehicle seat 10. The cover 40 can be composed of a material or materials that complement or contrast the material employed in the upholstery layer 26. The material employed in the outer or dress layer 60 of the cover 40 can be configured with designs or logos that enhance or personalize the vehicle seat design.

Where desired or required, the cover 40 can be configured to be reversible. In an embodiment as depicted in FIG. 3B, the cover 40 can be configured with suitable opposed outwardly positioned layers 60, 62 composed of materials chosen to enhance different functionalities of the cover 40. By way of non-limiting example, a first outwardly positioned or layer 60 can be configured as a dress layer composed of a material that complements or contrasts the upholstery layer 26 of vehicle seat 10. The second opposed outwardly positioned layer 62 is opposed to the first layer 60 and can be composed of a protective material that resists soiling, tearing etc. Where desired or required, the material employed in the second layer 62 can be one that dissipates localized pressure applied to it.

The first layer 60 configured as the dress layer can be oriented in an outwardly facing occupant-contacting direction when the cover 40 is in general use. The cover 40 can be secured with the second layer 62 composed of a protective material facing upwardly or outwardly relative to the vehicle seat 10 when transport of potentially dirty or damaging materials is anticipated. The cover 40 can be reversed between the two layers depending on the needs of the user.

It is also contemplated that the cover 40 can include various intermediate layers or materials. Such materials include but are not limited layers that promote user comfort as well as ventilation and/or wicking of moisture such as layer 64 as well as cushioning layer 66. Non-limiting examples of such materials suitable for layer 64 include padding, high loft batting and the like. Nonlimiting examples materials suitable for the cushioning layer 66 include foamed polymeric material and the likes. The intermediate layer(s) can be configured as panels or layers if desired or required. Alternately, the intermediate layer(s) can be configured in any suitable geometry or configuration. Thus the intermediate layer can be configured as a support member to help orient the user relative to the seat 10 if desired or required. Non-limiting examples of such orientation can include height elevation, hip and thigh placement and the like.

Where the cover 40 has multiple layers, the various layers can be positioned in overlying relationship to one another. The various layers can be affixed to one another in any suitable manner. It is contemplated that the various layers can be affixed to one another at the outer edge 48. Other points of contact between the various layers can be positioned as required. Contact can be accomplished by any suitable means including tacking spot fusion and the like. Where desired or required, one or more layers can be laminated to one another or can be tacked to each other in any other suitable manner.

Figure 1:
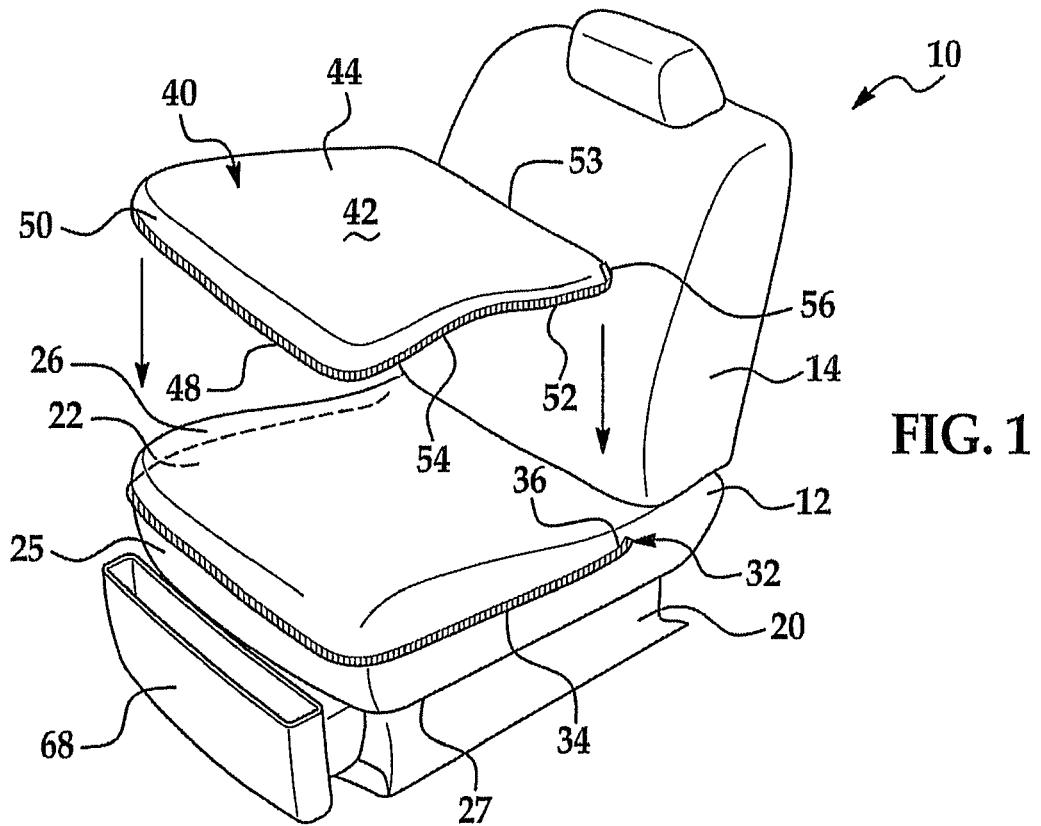
FIG. 1 is a perspective view of an embodiment as disclosed herein.
Figure 2:
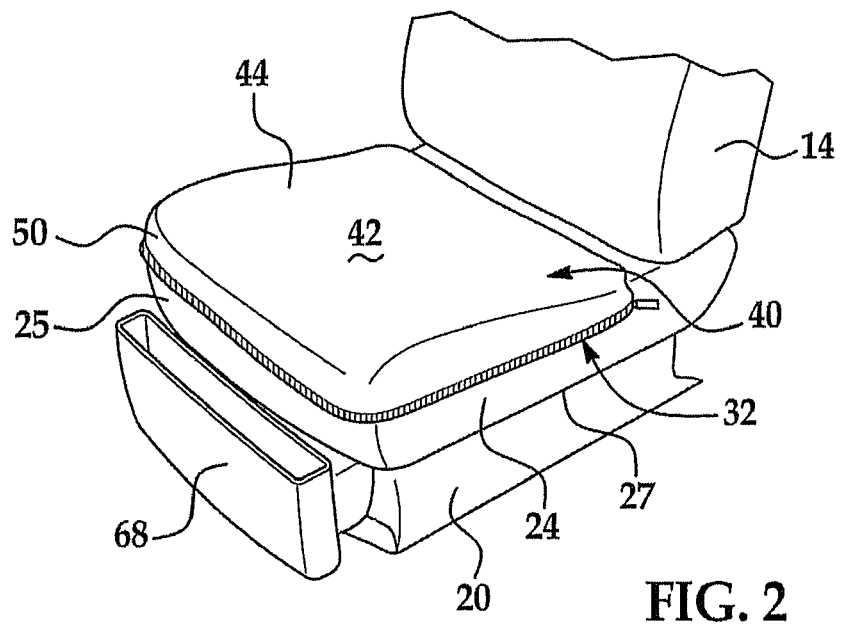
FIG. 2 is a perspective view of an embodiment as disclosed herein with a cover in place.

The seat 10 or seat portion 12 may also include any suitable storage compartment 68 connected to the seat 10 at an appropriate location and configured to receive and store cover 40 when the cover is not in use. As depicted in FIGS. 1 and 2, storage member is a sleeve positioned proximate to the front portion of the vehicle seat 10. Other configurations can be employed as desired or required.

The attachment mechanism 32 can be integrated into the seat portion 10 in any suitably aesthetic manner. Depending upon the location of the attachment mechanism and the style of seat 10, the attachment mechanism 32 can be exposed. In the embodiment as depicted in the drawing figures, the upholstery layer 26 can include a suitable flap 70 affixed to the outer face 30 of upholstery layer 26 proximate to attachment mechanism 32 configured to overlay the attachment mechanism 32 in a suitable manner. The flap can be made of any suitable material. One nonlimiting example of a suitable material would be upholstery material similar to that of upholstery layer 26.

Figure 4B:
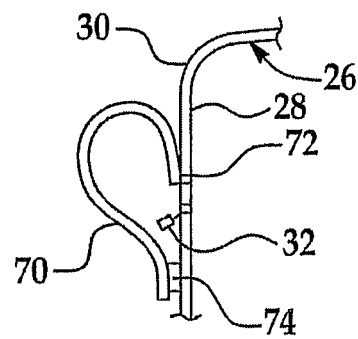
FIG. 4B is a detail view of the flap.

The flap 70 can be configured to releasably cover the attachment mechanism 32 when the cover 40 is disengaged from the seat 10. As depicted in FIG. 4B, the flap 70 can be affixed to the outer face 30 of the upholstery layer 26 at a location above the attachment mechanism 32 by an upper seam 72. The flap 70 can pivot at seam 72 between a first position overlying the attachment mechanism 32 and a second position in which the attachment mechanism 32 is exposed. The flap 70 can include a suitable releasable fastener(s) 74 to permit the releasable engagement of the flap 70 in overlying relation to the attachment mechanism 32 when the cover 40 is not in use. In an embodiment as depicted, the flap 70 has a curvilinear extension from the outer face 30 of upholstery layer 26. Where desired or required, the flap 70 may be positioned in a more flush overlying relationship with the associated portion of the upholstery layer 26.

When the cover 40 is in position on the seat portion 12, the attachment mechanism 32 is in engagement with attachment member 52. The flap 70 may be pivoted to its open position and interposed between the cover 40 and an associated portion of the upholstery layer 26.

The flap 70 can be positioned and configured in any manner that suitably covers the attachment mechanism 32 when the cover 40 is not affixed to the seat 10. Thus the flap 70 may be attached at a location below the attachment mechanism 32 in various configurations and embodiments. When the cover 40 is removed, the flap 70 can be fastened with fastener 74 to provide a decorative cover for the attachment mechanism 32.

In the embodiment depicted in the drawing figures, when the cover 40 is connected to the upholstery layer 26, the flap 70 can be lifted and positioned in upwardly oriented overlying relationship to the upholstery layer 26. As the attachment mechanism 52 of the cover 40 is connected to the attachment mechanism 32, the flap 70 was interposed between the appropriate portion of the cover 40 and upholstery layer 26

Alternately in configurations where the flap 70 attached at a location below attachment mechanism 32, the flap 70 can be releasably attached to that upholstery layer 26 at a location above the attachment mechanism 32 in order to cover the attachment mechanism 32 when the cover 40 is not affixed to the seat 10. When the cover 40 is to be attached to that seat 10, that flap 70 can be pivoted to a lowered position and the cover 40 attached in that manner described previously. The fastener 74 can be configured to fasten to the outer surface of the cover 40 when the cover 40 is in position on the seat 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A seat portion for a vehicle seat, the seat portion comprising:
a cushioning member having a seating surface and a leading lateral surface and a pair of lateral surfaces extending from the seating surface;
an upholstery layer covering the seating surface and the lateral surfaces, the upholstery layer having an outwardly facing face and at least one attachment mechanism connected to the outwardly facing face at a position along the lateral surfaces; and
a cover dimensioned to fit that seating surface and substantially covering the upholstery layer at a location proximate to the seating surface of the cushioning member, the cover releasably connected to the attachment mechanism,
wherein the upholstery layer further includes at least one fastener connected to the upholstery layer, a flap connected to the upholstery layer, and at least one fastener connected to the flap, wherein the upholstery layer fastener and the flap fastener are positioned relative to one another such that the attachment mechanism is releasably enclosable between the flap and the upholstery layer.

2. The seat portion of claim 1, wherein the cover includes an attachment member detachably engageable with the attachment mechanism of the upholstery layer.

3. The seat portion of claim 2, further comprising a storage compartment configured to contain the cover.

4. The seat portion of claim 2, wherein the attachment mechanism is at least one of a zipper element, a hook and loop fastener element, and a snap element and wherein the attachment member of the cover is matingly engageable with the attachment mechanism.

5. The seat portion of claim 2, wherein the cover is one of a protector panel, a cushion or a support member.

6. The seat portion of claim 2 wherein the cover comprises at least one layer, the layer being at least one of a dress layer a cushioning layer and a liquid resistant layer.

7. The seat portion of claim 6 wherein the cover is reversible.

8. The seat portion of claim 1, wherein the attachment mechanism is at least one of a zipper element, a hook and loop fastener element, and a snap element.

9. The seat portion of claim 1, wherein the flap fastener is engageable with the upholstery fastener to releasably secure a free end of the flap to the upholstery layer.

10. The seat portion of claim 1, wherein a fixed end of the flap is pivotally connected to the upholstery layer for pivotal movement between a first position, where the flap overlies the attachment mechanism, and a second position, where the attachment mechanism is exposed.

11. The seat portion of claim 10, wherein the attachment mechanism is connected to the upholstery layer at a position between a fixed end of the flap and the upholstery layer fastener.

12. A vehicle seat comprising:
a seat portion, the seat portion including a cushioning member having a seating surface and a plurality of surfaces extending laterally outward from the seating surface of the cushioning member;
an upholstery layer covering the seating surface and the lateral surfaces of the seat portion, the upholstery layer having an outer face and at least one attachment mechanism attached to the outer face at a location proximate to the lateral surfaces of the cushioning member; and
at least one cover member, the cover member having an attachment member, the attachment member detachably connected to the attachment mechanism and dimensionally conforming to the seating surface and covering at least a portion of the seating surface of the upholstery layer,
wherein the upholstery layer further includes at least one fastener connected to the upholstery layer, a flap connected to the upholstery layer, and at least one fastener connected to the flap, wherein the upholstery layer fastener and the flap fastener are positioned relative to one another such that the attachment mechanism is releasably enclosable between the flap and the upholstery layer.

13. The vehicle seat of claim 12, further comprising a storage compartment configured to removably store the cover member, the cover member moveable between an attached position and a stored position.

14. The vehicle seat of claim 12, wherein the attachment mechanism and attachment member are at least one of a zipper device, hook and loop fastener, and snaps.

15. The vehicle seat of claim 12, wherein the cover member is one of a protector panel, a cushion or a support member.

16. An automobile having at least one vehicle seat, the vehicle seat including at least one seat portion, the seat portion comprising:
a cushioning member having a seating surface and a plurality of lateral surfaces extending from the seating surface;
an upholstery layer covering the cushioning member, the upholstery layer having an outer face and including at least one attachment mechanism connected to the outer face and at least one flap connected to the upholstery layer in overlying relation to the attachment mechanism;
and at least one cover member, the cover member having an attachment member, the attachment member detachably connected to the attachment mechanism and dimensionally conforming to the seating surface and covering at least a portion of the seating surface of the upholstery layer, wherein the upholstery layer further includes at least one fastener connected to the upholstery layer, a flap connected to the upholstery layer, and at least one fastener connected to the flap, wherein the upholstery layer fastener and the flap fastener are positioned relative to one another such that the attachment mechanism is releasably enclosable between the flap and the upholstery layer.

17. The automobile of claim 16, wherein the cover is one of a protector panel, a cushion or a support member.

* * * * *